United States Patent [19]
Mori et al.

[11] Patent Number: 6,072,917
[45] Date of Patent: *Jun. 6, 2000

[54] CODE SHEET AND INFORMATION REPRODUCTION APPARATUS

[75] Inventors: Takeshi Mori, Machida; Hiroshi Sasaki, Hachioji, both of Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,099

[22] Filed: Jul. 17, 1996

[30] Foreign Application Priority Data

Aug. 3, 1995 [JP] Japan .................................. 7-198652

[51] Int. Cl.[7] ...................................................... G06K 9/20
[52] U.S. Cl. ......................... 382/317; 235/375; 395/109
[58] Field of Search ................................... 382/317, 100; 395/112, 109; 369/54; 360/103; 428/411.1; 400/63, 68; 374/250, 254; 358/298, 300, 296, 409; 235/375

[56] References Cited

U.S. PATENT DOCUMENTS

| | | | |
|---|---|---|---|
| 4,276,573 | 6/1981 | Harada et al. .......................... 360/103 |
| 4,670,345 | 6/1987 | Morimoto et al. .................... 428/411.1 |
| 5,142,594 | 8/1992 | Sugishima ................................ 382/100 |
| 5,194,879 | 3/1993 | Kotabe et al. ........................... 347/254 |
| 5,290,109 | 3/1994 | Midorikawa ............................... 400/68 |
| 5,309,548 | 5/1994 | Ohta et al. ............................... 395/109 |
| 5,488,223 | 1/1996 | Austin et al. ............................ 235/375 |
| 5,488,595 | 1/1996 | Takeuchi et al. .......................... 369/54 |
| 5,561,744 | 10/1996 | Sugaya et al. ........................... 395/112 |

FOREIGN PATENT DOCUMENTS

WO96/03710  2/1996  WIPO ............................ G06K 19/00

*Primary Examiner*—Jose L. Couso
*Assistant Examiner*—Anh Hong Do
*Attorney, Agent, or Firm*—Frishauf, Holtz, Goodman, Langer & Chick, P.C.

[57] ABSTRACT

A code sheet is prepared which records thereon one or more optically readable control dot codes and is used to change or process the output format of multimedia information. When the control dot code is read by an information reproduction apparatus for optically reading a data dot code from a recording medium which records thereon the multimedia information in the form of the data dot code, and outputting data corresponding to the multimedia information, a data separation section separates a control instruction included in the control dot code, and a system control section controls, in accordance with the control instruction, a reproduction section so as to change or process the multimedia information obtained from the data dot code.

9 Claims, 9 Drawing Sheets

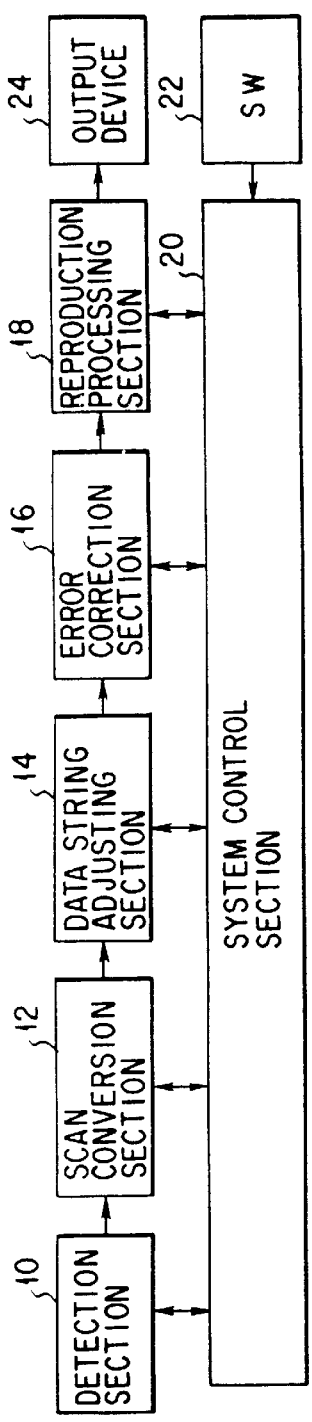
F I G. 1
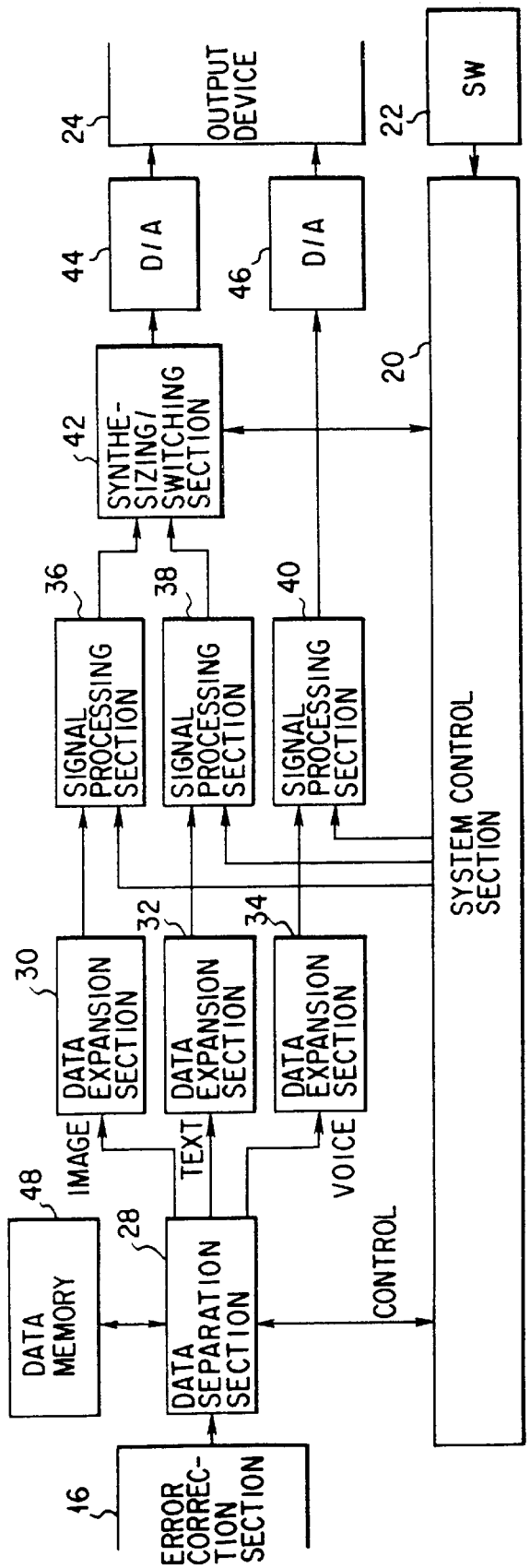
F I G. 3

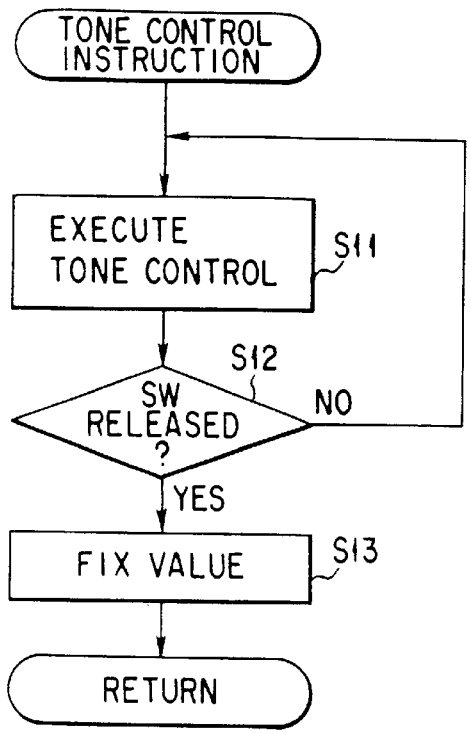
F I G. 6
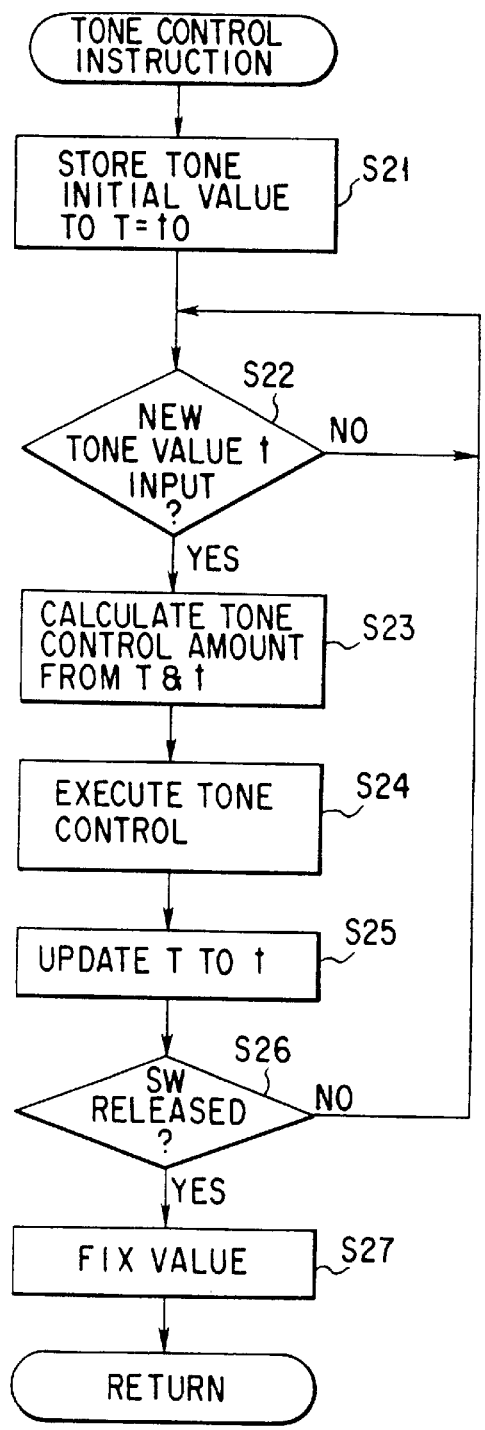
F I G. 7

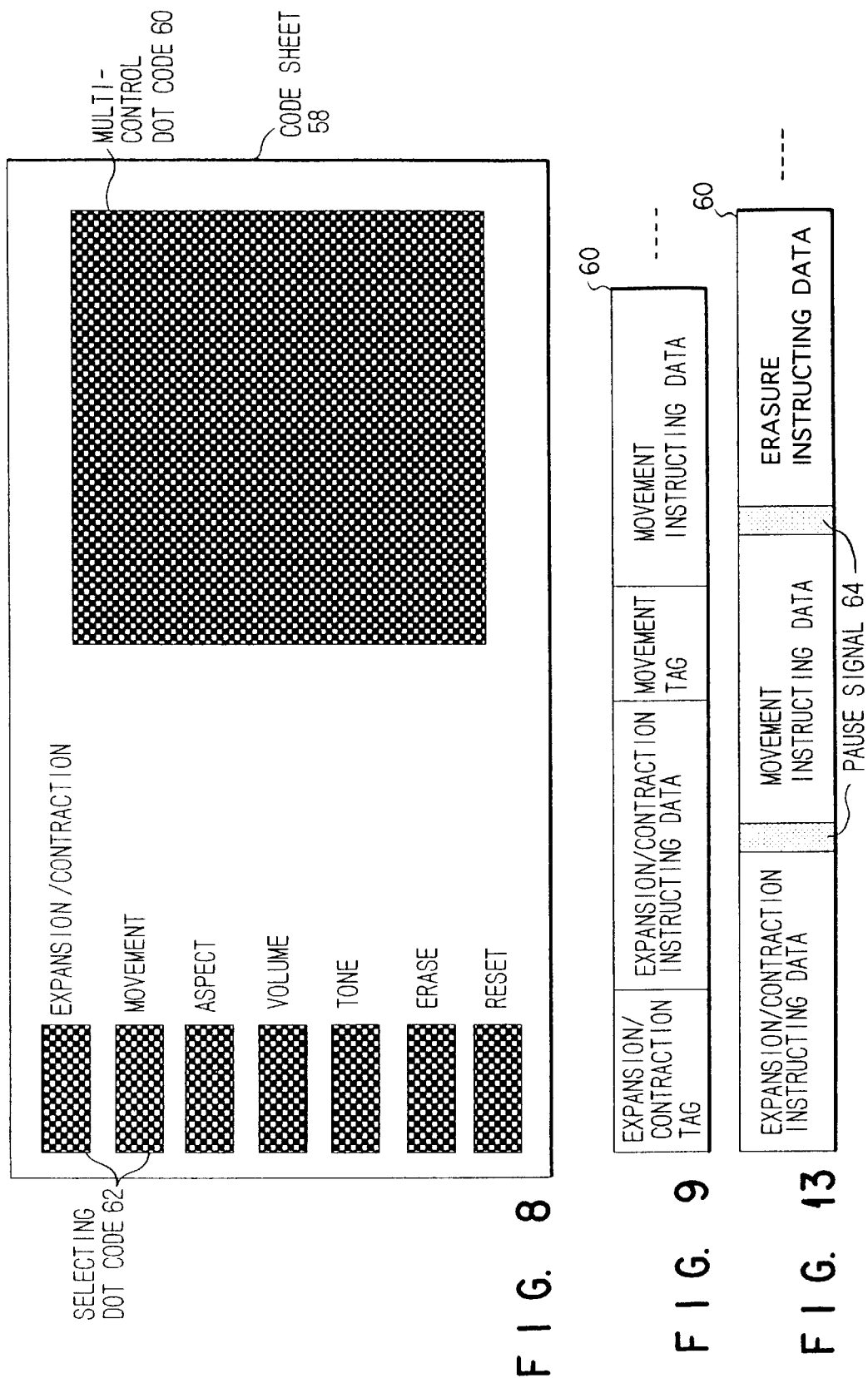

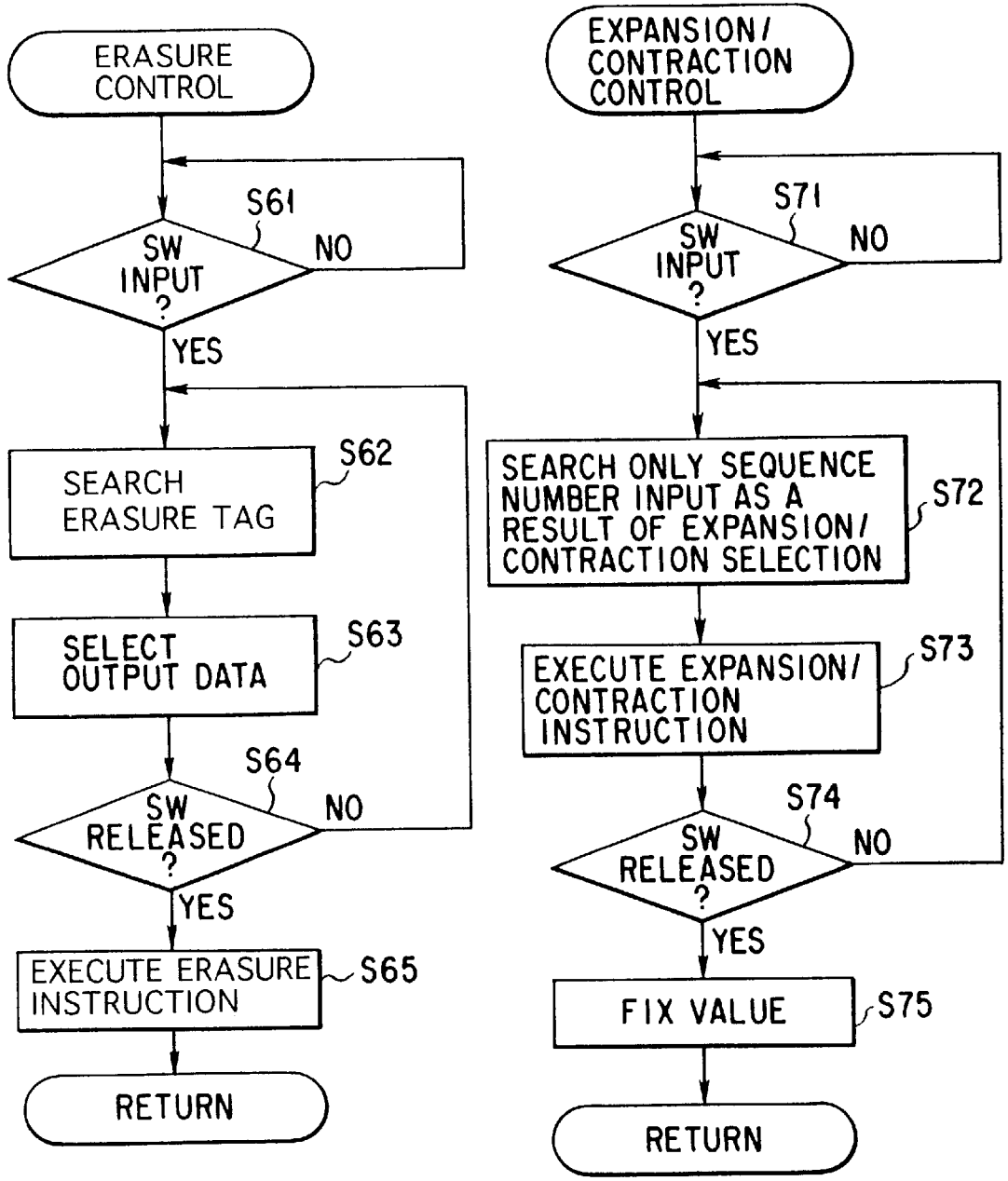

CODE SHEET AND INFORMATION REPRODUCTION APPARATUS

BACKGROUND OF THE INVENTION

1. Field of the Invention

This invention relates to an information reproduction apparatus for optically reading a code pattern recorded in an optically readable manner on a recording medium such as paper, and reproducing original multimedia information corresponding to the code pattern, the multimedia information including audio information such as voice and music, image information obtained by a camera, a video camera, etc., and digital code data obtained by a personal computer, a word processor, etc.

The invention also relates to a code sheet which records control information for the information reproduction apparatus.

2. Description of the Related Art

There are known various conventional mediums for recording voice, music, etc., such as magnetic tapes and optical disks. Each of these mediums, however, is relatively expensive even if a great number of copies are produced, and requires a relatively large place to store them. Further, in the case, for example, of an audio medium with voices recorded therein, it requires a great amount of labor and time to transfer it to a remote place directly or by mail. The same can be said of so-called multimedia information other than the audio information, such as image information obtained by a camera, a video camera, etc., digital code data obtained by a personal computer, a word processor, etc.

To deal with the above problem, EP 0,670,555 A1 (corresponding to U.S. Ser. No. 08/407,018) discloses a system capable of transmitting, by facsimile, multimedia information which includes at least one of audio information, image information and digital code data, also capable of recording image information which can be copied at low cost in great quantities, i.e. encoded information, on a recording medium (such as paper) in the form of a two-dimensional code pattern including a plurality of dots, and capable of reproducing the multimedia information.

In the disclosed system, there may be a case where the volume of a voice (in the case of audio information) should be varied at the time of reproducing original multimedia information corresponding to a read code pattern.

In such a system, however, control of reproduction output is not considered.

SUMMARY OF THE INVENTION

The invention has been developed under the above-described circumstances, and aims to provide a system capable of varying or adjusting the format of output at the time of reproducing original multimedia information corresponding to a read code pattern.

According to an aspect of the invention, there is provided a code sheet comprising: a sheet recording medium; and at least one control code recorded on the sheet recording medium, the control code being optically readable and capable of changing or processing the output format of multimedia information which includes at least one of audio information, image information and digital code data.

According to another aspect of the invention, there is provided an information reproduction apparatus comprising: reading means for optically reading multimedia information which includes at least one of audio information, image information and digital code data and is recorded on a recording medium in the form of an optically-readable code; reproduction means for processing the code read by the reading means and outputting the processed code as data relating to the original multimedia information; data discrimination means for determining whether the data processed by the reproduction means on the basis of the code relates to the multimedia information or relates to control information for changing or processing the output format of the multimedia information; and control information output means for outputting control information used to perform change or processing corresponding to the control contents of the control information, when the data discriminated by the data discrimination means relates to the control information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing an information reproduction apparatus according to a first embodiment of the invention;

FIG. 3 is a block diagram showing a reproduction section incorporated in the apparatus of FIG. 1;

FIG. 6 is a flowchart illustrating a subroutine for processing a control code to perform tone quality control;

FIG. 7 is a flowchart illustrating another subroutine for processing a control code to perform tone quality control;

FIG. 8 is a view showing a code sheet employed in a second embodiment;

FIG. 9 is a view showing the contents of a multi-control dot code appearing in FIG. 8;

FIG. 12 is a flowchart illustrating a subroutine for processing a control code to perform erasion control in the second embodiment;

FIG. 13 is a view showing the contents of a multi-control dot code employed in a third embodiment;

FIG. 14 is a flowchart illustrating a subroutine for processing a control code to perform expansion control in the third embodiment;

DETAILED DESCRIPTION OF THE PREFERRED EMBODIMENTS

Figure 2:
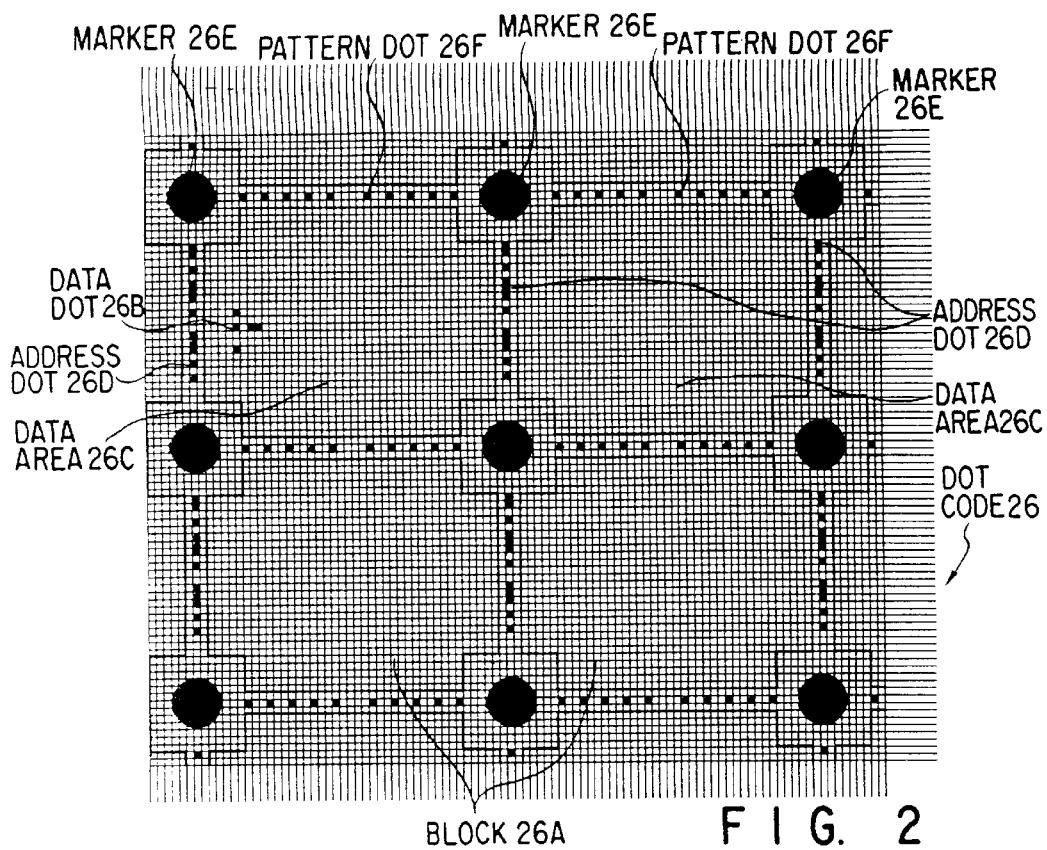
FIG. 2 is a view showing the format of a dot code.

The embodiments of the invention will be explained with reference to the accompanying drawings.

FIG. 1 is a block diagram showing an information reproduction apparatus according to a first embodiment of the invention. The information reproduction apparatus has a pen-type information reproduction unit, which the user (operator) can grasp and use to scan a dot code as a two-dimensional code pattern recorded on a recording medium (not shown) such as a paper sheet. The pen-type information reproduction unit contains a detection section 10, a scan conversion section 12, a data string adjusting section 14, an error correction section 16, a reproduction section 18, a system control section 20, a switch (SW) 22 to be operated to indicate the state of scanning, and an output device 24 for outputting reproduced multimedia information.

As is shown in FIG. 2, the dot code is multimedia information which is recorded in the form of an optically readable code and includes at least one of voice information, image information and text data.

More specifically, a dot code 26 comprises a plurality of blocks 26A arranged in the form of a matrix and each having a predetermined number of data dots. Each block 26A has a data area 26C which contains a plurality of data dots 26B arranged in accordance with the contents of information, and block address dots 26D indicative of an address assigned to the block and arranged in a predetermined portion of the block close to the data area. Further, each block 26A has markers 26E arranged at the four corners thereof, and predetermined matching pattern dots 26F interposed between adjacent markers which are arranged, for example, in a first direction. The address dots 26D are interposed between adjacent markers which are arranged, for example, in a second direction. The pattern dots 26F, the address dots 26D and the data dots 26B located in the data area 26C have the same size. The markers 26E are circular dots with a diameter of e.g. 7 data dots, which are larger than the other dots.

The detection section 10 is responsive to the operation of the SW 22 for reading the dot code 26 constructed as above. The scan conversion section 12 subjects image data from the detection section 10 to correction processing for correcting the inclination thereof, etc. during scanning, thereby recognizing the image data as a dot code. The dot code indicative of the image data is binarized, then demodulated, and output to the data string adjusting section 14. The data string adjusting section 14 adjusts a data string, and the error correction section 16 corrects that error included in data from the data string adjusting section 14, which has occurred at the time of reproducing the data. The reproduction section 18 separates data corrected by the error correction section 16, in accordance with the attribute thereof, and expands the data. The system control section 20 including a CPU, etc. controls the detection section 10 through the reproduction section 18, and also performs transmission of data from/to the sections 10–18.

The output device 24 includes a voice reproduction unit such as a speaker, and a display unit such as a CRT monitor.

The SW 22 may be manually operated by the user, or may be a sensor which is provided at a tip of the pen-type information reproduction unit and will be turned on when it is brought into contact with a recording medium.

FIG. 3 shows the reproduction section 18 in more detail. As is shown in FIG. 3, the section 18 is constituted by a data separation section 28, data expansion sections 30, 32 and 34, signal processing section 36, 38 and 40, a synthesizing/switching section 42, and D/A converters 44 and 46.

The data separation section 28 receives data output from the error correction section 16, separates the data into image data, text data and voice data, and supplies the data items to data expansion sections 30, 32 and 34, respectively.

In the data expansion section 30, the image data is subjected to predetermined data expansion processing. Specifically, if the image data is JPEG-compressed, it is subjected to JPEG decompression processing. Thereafter, the image data is supplied to the signal processing section 36, where it is subjected to interpolation. The image data is then supplied to the synthesizing/switching section 42.

Similarly, in the data expansion section 32, the text data is subjected to decompression processing corresponding to MR/MH/MMR in data compression, etc., or to decompression processing corresponding to Huffman coding, Lempe-Ziv coding, etc. Subsequently, the text data is supplied to the signal processing section 38, where it is subjected to interpolation. The text data is then supplied to the synthesizing/switching section 42.

The image data and the text data are synthesized or switched by the synthesizing/switching section 42, and then output, via the D/A converter 44, to a monitor, etc. included in the output device 24, where it is displayed.

On the other hand, the voice data is subjected to decompression processing corresponding to ADPCM in the data expansion section 34, and then subjected to interpolation in the signal processing section 40. Then, the voice data is output, via the D/A converter 46, to a speaker, etc. included in the output device 24, where it is output therefrom in the form of voice.

The detailed functions of the detection section 10 through the A/D converter section 46 are disclosed in U.S. Ser. No. 08/407018 filed by the same applicant as the present application.

In addition to the above-described structural elements, this embodiment employs a data memory 48 provided in the reproduction section 18. The data separation section 28 separates the multimedia information from control data, thereby storing the multimedia information or the control data in the data memory 48.

Figure 4:
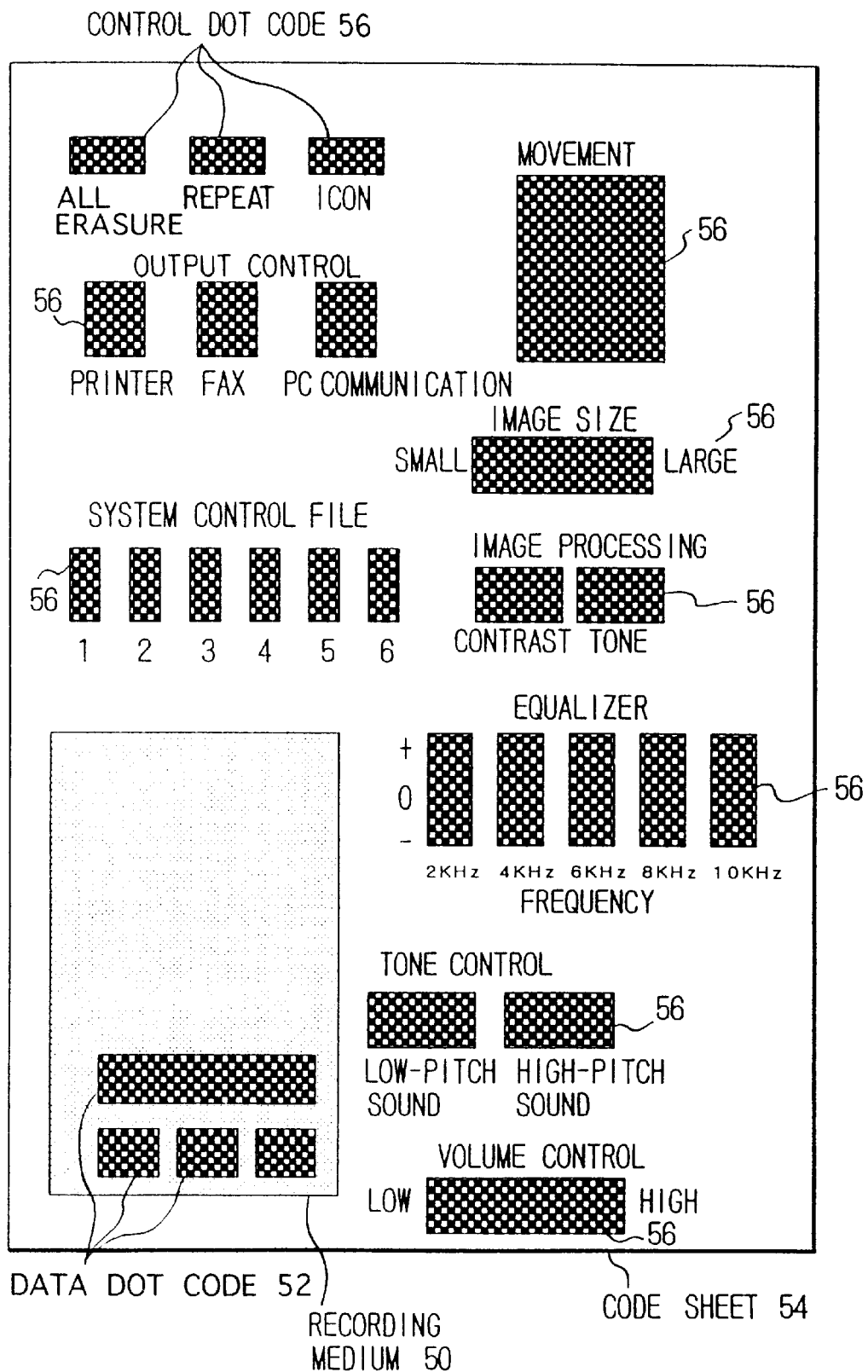
FIG. 4 is a view showing a code sheet employed in the first embodiment.

The multimedia information is obtained by scanning a data dot code 52 recorded on a recording medium 50 as shown in FIG. 4. On the other hand, the control data is obtained by scanning one of a plurality of control dot codes 56 recorded on a code sheet 54.

The data memory 48 stores multimedia information obtained by scanning the data dot code 52 before the scanning of the control dot code 56. On the other hand, where the control dot code 56 is scanned first, and then the data dot code 52 is scanned, the data memory 48 stores the control data. In this case, the control data may be stored in a memory (not shown) incorporated in the system control section 20.

The system control section 20 receives the control data directly from the data separation section 28 or from the data memory 48 via the separation section 28, and changes or processes the output format of multimedia information by controlling the signal processing in the signal processing sections 36–40 on the basis of the control data.

As regards image data, for example, control data for instructing the following changes and processes can be recorded on the code sheet 54 as the control dot codes 56:

Expansion (Magnification) or Contraction;
Edge Emphasis;
Hue Change;
Erasure of Image;
Change of Contrast or Brightness;
Chroma Change;
Gamma Correction;
Rotation of Image;
Mirror Image of Image;
Fade-in or Fade-out;
Movement of Image;
Change of Aspect Ratio;
Change of Gradation;
Filtering (Noise Removal) Processing;
Morphing
Selection of Priority at the Time of Superposing Images; and
Using Iconic Image Further, in the case of synthesized images, the following changes and processes can be instructed:

Multiplex;
Superimpose; and
Display of Plural Images Like Multi-screen.

Similarly, as regards voice data, control data for instructing the following changes and processes can be recorded on the code sheet 54 as the control dot codes 56:

Change of Volume;
Change of Tone;
Instruction How to Equalize;
Change of Output Speed of Voice;
Instruction of Voice Stop;
Change of Direction of Reproduction (Instruction of Reverse Reproduction);
Instruction of Repeat;
Instruction of Source-Direct (Through Output Without Filters); and
Channel Selection in the Case of Stereo Sound (Monophonic, Right, Left).

Moreover, to synthesize voices, the control dot codes 56 are used to instruct, for example, to multiplex voices, etc.

As regards text data, control data for instructing the following changes and processes can be recorded on the code sheet 54 as the control dot codes 56:

Change of Font;
Change of Size;
Designation of Color; and
Instruction of Scroll Display.

In addition, other control data can be recorded as the control dot codes 56 on the code sheet 54. For example:

Coupling of Information: Where two different data dot codes 52 are respectively scanned, and control data for instructing to obtain the sum of the two difference data dot codes is recorded as the control dot code 56, multimedia information obtained from the two data dot codes 52 can be reproduced at a time by scanning the control dot code 56.

Selection of Output Form: Where control data for selecting, as the output device 24, a printer, a facsimile, a personal computer (communication), a monitor, or a speaker is recorded as the control dot code 56, an individual output format can be selected only by scanning the control dot code 56 without operating a keyboard, etc.

Decrypting Code: The data dot code 52 can be encrypted so as to prevent original multimedia information from being reproduced only by scanning the same, and information for decrypting the encrypted code can be recorded as the control dot code 56.

System Control File: This file includes information indicative of a processing parameter in each section necessary to read a dot code, and can be recorded as the control dot code 56. The system control file is explained in detail in PCT National Application No. 01467/95 filed on Jul. 24, 1995 by the same applicant of this application.

Figure 5:
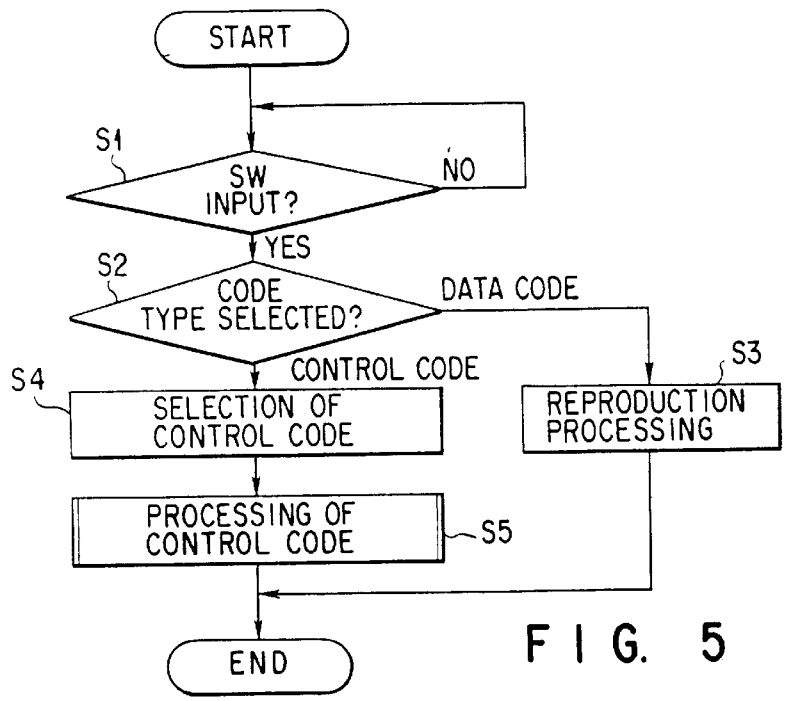
FIG. 5 is a flowchart useful in explaining the operation of the first embodiment.

Referring then to the flowchart of FIG. 5 illustrating the operation of the system control section 20, the operation of the section 20 assumed when the control dot code 56 has been read will be explained.

Upon operating the SW 22 (step S1), the system control section 20 operates each section to read a dot code. Then, the system control section 20 determines, on the basis of data supplied from the data code separation section 28, whether the read dot code is one of the data dot codes 52 on the recording medium 50 or one of the control dot codes 56 on the code sheet 54 (step S2). If it is the data dot code 52, the control section 20 performs usual reproduction processing and stores the data in the data memory 48 (step S3). The reproduction processing is finished when the SW 22 is released.

On the other hand, if the read dot code is the control dot code 56, the contents of the control dot code 56 are recognized (step S4), and that one of the signal processing sections 36, 38 and 40 which corresponds to the contents of the code 56 is controlled so as to change or process data stored in the data memory 48 in accordance with the contents of the code (step S5). The processing of the control code performed in the step S5 will be explained in detail.

If the control dot code 56 is a tone control instruction, the signal processing section 40 is controlled to perform tone control of voice data stored in the data memory 48, as is shown in FIG. 6 (step S11). Subsequently, it is determined whether or not the SW 22 is released (step S12). If the SW 22 is kept pushed (i.e. it is kept on), the program returns to the step S11, where further tone control is performed. If, on the other hand, the SW 22 is released (i.e. it is turned off), the tone is fixed as it is (step S13), thereby terminating the processing.

For example, in the case shown in FIG. 4, a low-pitched-tone control code and a high-pitched-tone control code are recorded as the voice control dot codes 56 on a lower right portion of the code sheet 54. Further, a left portion of the low-pitched tone control code stores an instruction (in the form of a dot code) to lower the tone, and a right portion of the same stores an instruction to raise the tone. When the instruction stored on the left portion is read, a low-pitched tone obtained by a little raising an original low-pitched tone is reproduced. In this example, it is not necessary to scan the control dot code 56. Instead only placing the pen-type information reproduction apparatus on the control dot code 56 and keeping on the SW 22 continuously causes the tone to change.

On the other hand, in the case where the tone is changed by scanning the control dot code 56, whether the tone is raised or lowered depends on the direction of scanning.

In this case, the following processing is performed:

As is shown in FIG. 7, first, an initial tone value t0 is stored as T in an internal memory at the start of the operation of the SW 22 (step S21). When a new tone value t is input by scanning the code 56 (step S22), a tone control amount is calculated on the basis of the initially read tone value T stored in the internal memory and the tone value t obtained by the scanning (step S23), thereby performing tone change control in the signal processing section 40 on the basis of the calculation result (step S24).

The tone control amount is calculated by multiplying a vector (T−t) by a coefficient K (i.e. the tone control amount is K×(T−t)). As regards the direction of control, whether the low-pitched tone is lowered or raised depends upon whether the vector (T−t) indicates the direction from the right to the left of the code sheet 54 or the opposite direction from the left to the right.

After the change of tone, the value T is updated to the new tone value t (step S25), and then it is determined whether or not the SW 22 is released (step S26). If the SW 22 is still in the pushed state, the program returns to the step S22, thereby repeating the above-described processing. If the SW 22 is released, the tone is fixed as it is (step S27), thereby terminating the processing.

In summary, in the former case, the control dot code 56 stores an instruction to control the tone, while in the latter case, the control dot code 56 stores information (numerical data) for detecting the tone control amount.

A second embodiment of the invention will be explained.

FIG. 8 shows a code sheet 58 employed in the second embodiment. The code sheet 58 records a multi-control dot code 60 including a plurality of control dot codes gathered in one area, and a plurality of selecting dot codes 62 for selectively designating only a desired one of the control dot codes included in the multi-control dot code 60. As is shown in one-dimensional manner in FIG. 9, the multi-control dot code 60 consists of a plurality of instruction data items recorded in line, and a plurality of tag information items each indicative of corresponding instruction data item and recorded immediately before the instruction data item.

The operation of the system control section 20 in the case of using the code sheet 58 will be explained.

The main operation is substantially the same as that performed in the first embodiment. Specifically, in the step S2, it is determined whether the data dot code 52 or the selecting dot code 62 is scanned. Moreover, the selection of the control code performed in the step S4 is replaced with the recognition of the contents of the read selecting dot code in response to the release of the SW 22.

Figure 10:
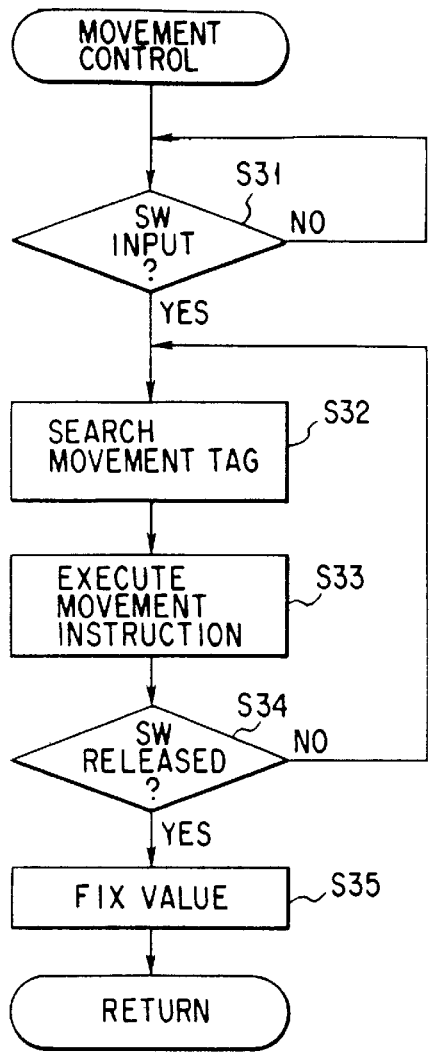
FIG. 10 is a flowchart illustrating a subroutine for processing a control code to perform movement control in the second embodiment.

The processing of the control code in the step S5 is performed in a manner as shown in FIG. 10, if image movement control is selected.

Specifically, when the SW 22 is turned on after the tip of the pen-type information reproduction apparatus is moved to the multi-control dot code 60 (step S31), the system control section 20 searches corresponding tag information, i.e. movement tag information, included in control data supplied from the data separation section 28 (step S32). Subsequently, the control section 20 controls the signal processing section 36 in accordance with movement instruction data, thereby moving image data stored in the data memory 48, on the monitor included in the output device 24 (step S33). Thereafter, it is determined whether or not the SW 22 is released (step S34). If the SW 22 is kept pushed, the program returns to the step S32 to search the movement tag information again. If the SW 22 is released, the moved display position is fixed as it is (step S35), thereby terminating the processing.

There is positional correspondence between the multi-control dot code 60 and a monitor screen, and the movement instruction data indicates a position of the monitor screen. Supposing that the image pickup area of an image pickup unit (not shown) incorporated in the detection section 10 can pick up an image of a size corresponding to a plurality of blocks 26A (e.g. four blocks), the multi-control dot code 60 is defined such that each group consisting of four blocks includes at least one single movement tag information item and at least one single movement instruction data item. If a plurality of tags of the same type are detected in a single image-pickup operation, instruction data corresponding to any one of the tags may be selected. Alternatively, the average value of the instruction data items may be used.

It is a matter of course that the multi-control dot code 60 may not necessarily correspond to such a screen. Alternatively, the screen movement control may be performed on the basis of a movement amount (a scanning amount) like a pointing device such as a mouse.

Figure 11:
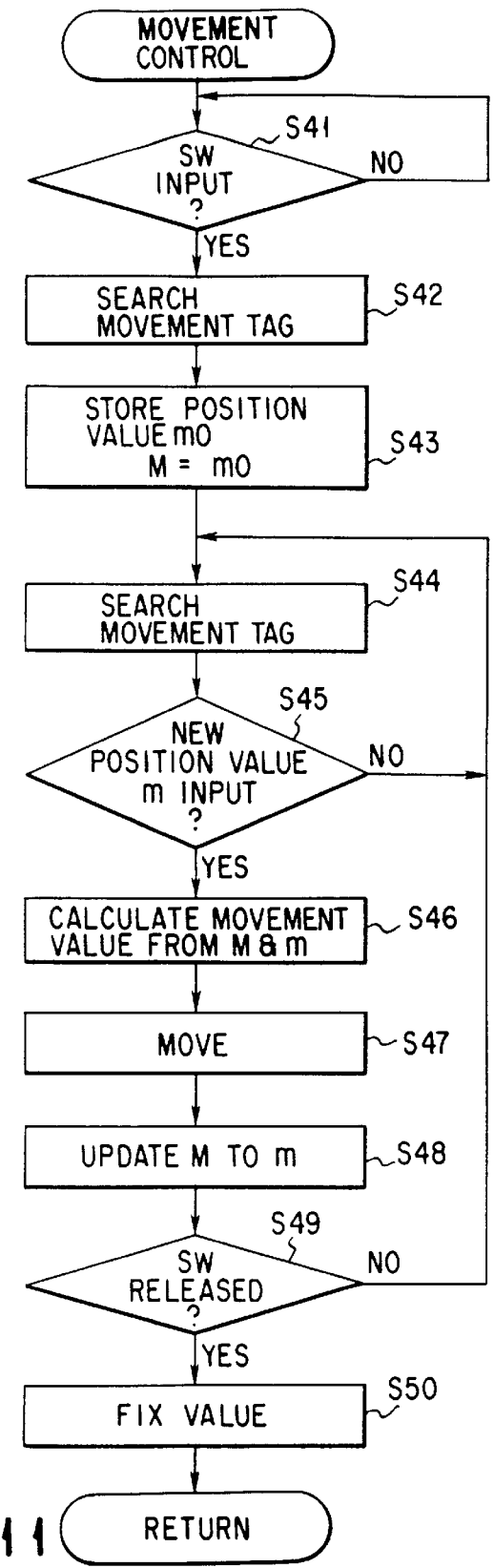
FIG. 11 is a flowchart illustrating another subroutine for processing a control code to perform movement control in the second embodiment.

In this case, the screen movement control is performed as illustrated in the flowchart of FIG. 11. Specifically, when the tip of the pen-type information reproduction apparatus is moved to the multi-control dot code 60, and the SW 22 is turned on (step S41), the system control section 20 refers to corresponding tag information, i.e. movement tag information, included in control data supplied from the data separation section 28 (step S42). Subsequently, the system control section 20 stores, in the internal memory, initial movement instruction data supplied following to the control data (in this case, a certain position information value m0 is stored as M in the internal memory) (step S43).

Thereafter, the next movement tag information is searched by further scanning of the pen-type information reproduction apparatus (step S44). If there is new movement instruction data (i.e. a new position value m) following to the movement tag information (step S45), the amount of movement is calculated from the stored value M and the new position value m (step S46). The movement amount is given by K×(M−m) (K: a coefficient; (M−m): a vector).

On the basis of the calculated movement amount, the signal processing section 36 is controlled so as to move the image data stored in the data memory 48, on the monitor included in the output device 24 (step S47).

After the image is moved, the value M is updated to the new position value m (step S48), and it is determined whether or not the SW 22 is released (step S49). If the SW 22 is kept pushed, the program returns to the step S44, where the movement tag information is searched again. When the SW 22 is released, the position is fixed as it is (step S50), thereby terminating the processing.

If image erasion control is selected, the processing as illustrated in FIG. 12 is performed.

When the tip of the pen-type information reproduction apparatus is moved to the multi-control dot code 60, and the SW 22 is turned on (step S61), the system control section 20 searches corresponding tag information, i.e. erasion tag information, included in control data supplied from the data separation section 28 (step S62), thereby selecting data to be erased in accordance with erasion instruction data supplied following to the control data (step S63). Subsequently, it is determined whether or not the SW 22 is released (step S64). If the SW 22 is still in the pushed state, the program returns to the step S62, thereby searching the erasion tag information again. When the SW 22 is released, the signal processing section 36 is controlled so as to erase image data from the selected image data (window) included in the image data stored in the data memory 48. Then, image data remaining in the data memory 48 is displayed on the output device 24 (step S65), thereby terminating the processing.

A third embodiment of the invention will now be explained. In this embodiment, a pause signal 64 for indicating a pause between each adjacent pair of control data items is recorded in place of the tag information in the multi-control dot code 60, as is shown in FIG. 13. More specifically, if the system control section 20 is informed of where in the multi-control dot code 60 each instruction data item is recorded, an instruction data item corresponding to control selected by scanning one of the selection dot codes 62 can be executed only by counting the pause signals 64.

For example, suppose that expansion/contraction control is selected by scanning a corresponding one of the selection dot codes 62. In this case, processing as shown in FIG. 14 is performed. Specifically, when the tip of the pen-type information reproduction apparatus is moved to the multi-control dot code 60, and the SW 22 is turned on (step S71), the system control section 20 searches instruction data with a number corresponding to the selected expansion/contraction control (step S72). To this end, first, the number of the pause signals 64 is counted. When a pause signal with a number corresponding to the expansion/contraction data has been reached, instruction data recorded following to the pause signal 64 with the corresponding number is determined to be the expansion/contraction data, thereby executing the instruction data (step S73). That is, the signal processing section 36 is controlled so as to display, on the monitor included in the output device 24, an expanded (magnified) or contracted one of an image corresponding to image data stored in the data memory 48.

Thereafter, it is determined whether or not the SW 22 is released (step S74). If the SW 22 is kept pushed, the program returns to the step S72 to repeat the above processing. If the SW 22 is released, the size of the image is fixed at the expanded or contracted one (step S75), thereby terminating the processing.

In the above operation, in a state in which the tip of the pen-type information reproduction apparatus is placed on the multi-control dot code 60, instruction data instructing the apparatus to expand the image by a certain percent is read, and the image is expanded in accordance with the read data.

Alternatively, the expansion/contraction control may be performed by an amount corresponding to the amount of scanning, as in the above-described tone control or movement control.

Figures 15, 16:
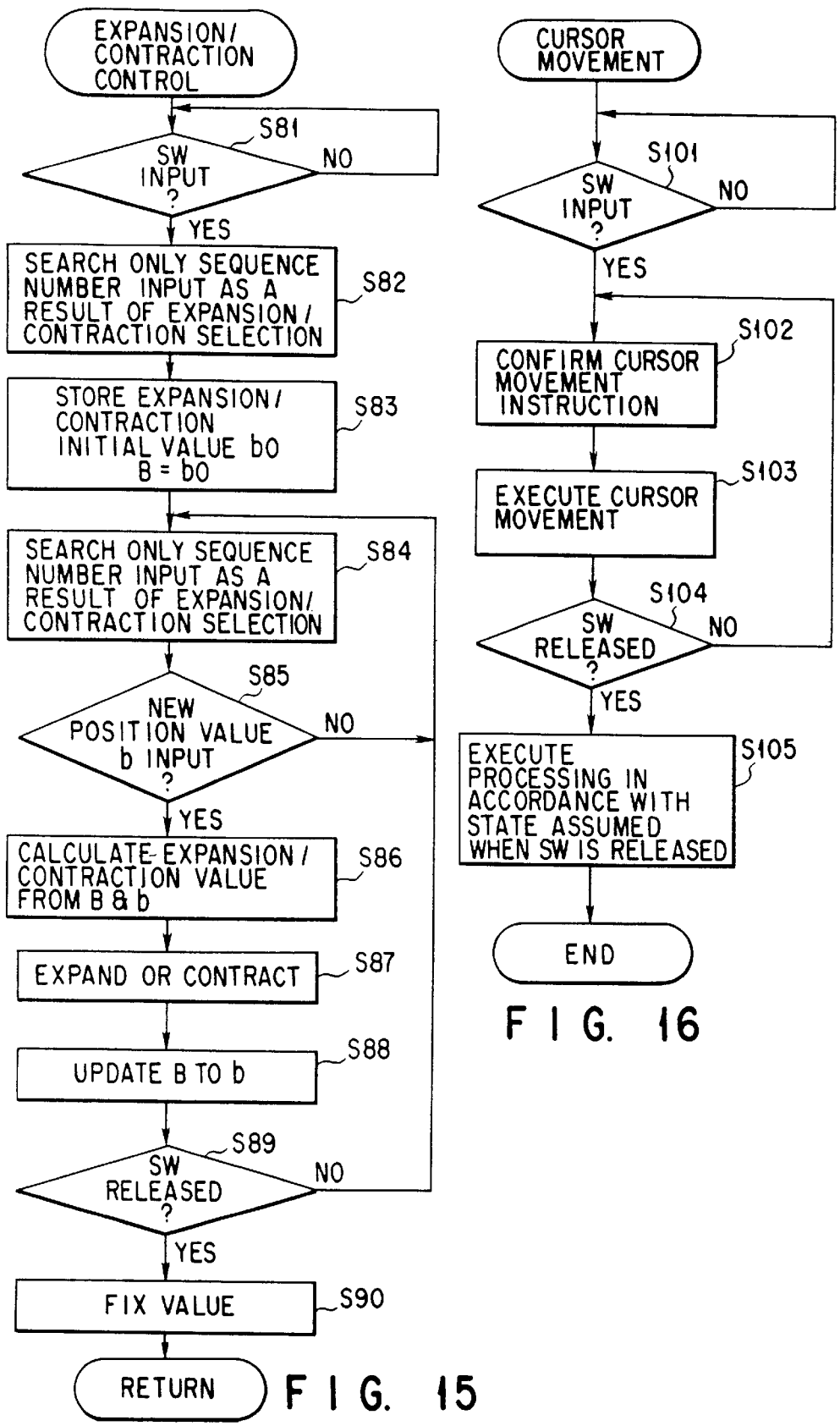
FIG. 15 is a flowchart illustrating another subroutine for processing a control code to perform expansion control in the third embodiment.
FIG. 16 is a flowchart useful in explaining the operation of a fourth embodiment.

Specifically, as is shown in FIG. 15, when the tip of the pen-type information reproduction apparatus is moved to the multi-control dot code 60, and the SW 22 is turned on to start scanning (step S81), the system control section 20 searches instruction data with a number corresponding to the selected expansion/contraction control (step S82), thereby storing an initial expansion value b0 as B in the internal memory (step S83).

Thereafter, pause signals 64 with a number corresponding to the next expansion/contraction control is counted. If a pause signal 64 with the number corresponding to the next expansion/contraction control is searched (step S84), it is determined whether or not there is a new expansion/contraction value b following to that pause signal. If there is the new value b (step S85), an expansion/contraction value is calculated from the stored value B and the new value b (step S86). The expansion/contraction amount is given by K×(B−b) (K: a coefficient; (B−b): a vector). Whether the processing is expansion or contraction depends upon whether the direction of the vector (B−b) is from a peripheral portion of the multi-control dot code 60 to the center of the same, or from the center to the peripheral portion.

On the basis of the calculated expansion/contraction amount, the signal processing section 36 is controlled so as to expand or contract image data stored in the data memory output the monitor included in the output device 24 (step S87).

After the image is expanded or contracted, the value B is updated to the new expansion/contraction value b (step S88), and it is determined whether or not the SW 22 is released (step S89). If the SW 22 is kept pushed, the program returns to the step S84, thereby repeating the above processing. When the SW 22 is released, the size of the image is fixed at the expanded or contracted one (step S90), thereby terminating the processing.

A fourth embodiment of the invention will be explained. In this embodiment, the pen-type information reproduction apparatus is used as a pointing device similar to a mouse, etc. In other words, a cursor is moved to a desired position to execute desired processing. That is, in the embodiment, movement of a cursor image as one of multimedia information items, and selection of processing can be controlled.

FIG. 16 is a flowchart, illustrating the operation of the apparatus. When the tip of the pen-type information reproduction apparatus is moved to the control dot code, and the SW 22 is turned on to start scanning (step S101), the system control section 20 confirms the contents of cursor movement instruction on the basis of control data supplied from the data separation section 28 (step S102). The control dot code employed in this case is supposed to have a positional correspondence with the monitor screen.

The cursor is moved in accordance with the confirmed contents (step S103). For example, the cursor movement can be realized by directly supplying cursor image data to the synthesizing/switching section 42, or by controlling the signal processing section 36 so as to create a cursor image.

Subsequently, it is determined whether or not the SW 22 is released (step S104). If the SW 22 is still in the pushed state, the program returns to the step S102, thereby repeating the above processing. When the SW 22 is released, processing is performed in accordance with the position of the cursor at the time of the release of the SW 22 (step S105). If there is an icon indicative of processing to be executed in the position of the cursor, the indicated processing is executed. In other words, processing similar to that performed by mouse click operation is executed.

Figure 17:
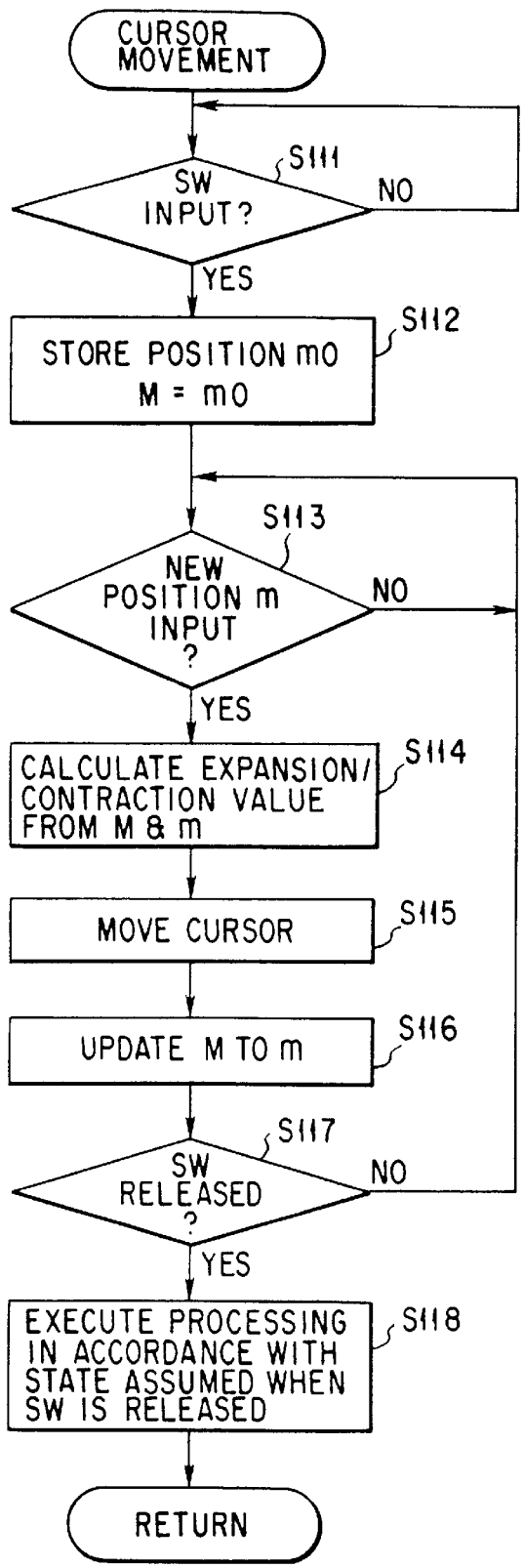
FIG. 17 is a flowchart useful in explaining the operation of a modification of the fourth embodiment.

Alternatively, processing as illustrated in FIG. 17 may be performed.

In this case, when the tip of the pen-type information reproduction apparatus is moved to the control dot code, and the SW 22 is turned on to start scanning (step S111), the system control section 20 obtains an initial position value m0 from control data supplied from the data separation section 28, thereby storing the value as M in the internal memory (step S112).

Thereafter, when a new position value m is input as a result of further scanning of the pen-type information reproduction apparatus (step S113), the amount of movement is calculated from the stored value M and the new position value m (step S114). The movement amount is given by K×(M−m) (K: a coefficient; (M−m): a vector).

On the basis of the calculated movement amount, the cursor is moved (step S115), the value M is updated to the new position value m (step S116), and then it is determined whether or not the SW 22 is released (step S117). If the SW 22 is kept pushed, the program returns to the step S113, thereby repeating the processing. When the SW 22 is released, processing is executed in accordance with the position of the cursor at the time of releasing the SW 22 (step S118).

The invention is not limited to the above-described embodiments, but may be modified in various manners without departing the scope thereof.

The invention can be summarized as follows:

(1) The invention provides a code sheet comprising:

a sheet recording medium; and at least one control code recorded on the sheet recording medium, the control code being optically readable and capable of changing or processing the output format of multimedia information which includes at least one of audio information, image information and digital code data.

As a result, the invention can easily subject output multimedia information to various kinds of processing.

(2) The code sheet according to the above item (1) is characterized in that the control code comprises a plurality of blocks, each of the blocks including:

a dot pattern consisting of a plurality of dots arranged in accordance with the contents of the change or processing of the control code;

a marker having a pattern different from the dot pattern and arranged in a first predetermined direction with respect to the dot pattern; and a block address pattern indicative of an address assigned to the dot pattern and arranged in a second direction with respect to the dot pattern.

Since the control code has the same format as the data code, a single reproduction apparatus can be used to process them.

(3) The code sheet according to the above item (1) or (2) is characterized in that each control code is assigned in accordance with the contents of the change or processing, separated from another control code.

Accordingly, desired processing can be performed by only one time scanning of the control code.

(4) The code sheet according to the above item (1) or (2) is characterized in that a plurality of control codes corresponding to the contents of the change and/or processing constitute a multi-control code, and characterized by further comprising a plurality of selecting codes for each selecting a desired control code, the multi-control code being arranged in the vicinity of the selecting codes and separated therefrom.

Accordingly, various kinds of processing can be performed by only one multi-control code, which can reduce the size of the code sheet.

(5) The code sheet according to the above item (4) is characterized in that each control code included in the multi-control code further includes a discrimination code corresponding to each selecting code and used for discriminating one control code from another.

As a result, selection of a control code can be performed by a small-capacity code, which can reduce the size of the code sheet.

(6) The code sheet according to any one of the above items (1)–(4) is characterized in that the contents of the change or processing based on the control code includes change of a cursor position corresponding to that spatial position in a predetermined control code on the sheet recording medium, in which a reading unit for optically reading the first-mentioned control code.

Accordingly, the code sheet can be operated in a manner similar to the case of using a mouse, which enhances the operability of the sheet.

(7) The code sheet according to any one of the above items (1)–(4) is characterized in that a control name indicative of the contents of each control code is attached in the vicinity of the control code.

Thus, the contents of each code can be easily recognized, which enhances the operability of the sheet.

(8) The invention further provides an information reproduction apparatus comprising:

reading means for optically reading multimedia information which includes at least one of audio information, image information and digital code data and is recorded on a recording medium in the form of an optically-readable code;

reproduction means for processing the code read by the reading means and outputting the processed code as data relating to the original multimedia information;

data discrimination means for determining whether the data processed by the reproduction means on the basis of the code relates to the multimedia information or relates to control information for changing or processing the output format of the multimedia information; and control information output means for outputting control information used to perform change or processing corresponding to the control contents of the control information, when the data discriminated by the data discrimination means relates to the control information.

Thus, reproduced information can be subjected to other processing only using the information reproduction apparatus. As a result, the value of the apparatus is enhanced, and the user need not use an apparatus dedicated to other processing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code sheet comprising:

a sheet recording medium;

multimedia information recorded on the sheet recording medium as an optically readable code pattern, said multimedia information including at least one of audio information, image information and digital code data, and said multimedia information having a content which is optically visible in a non-human-comprehensible form;

a control code also recorded on the sheet recording medium as an optically readable code pattern, said control code representing control data used for executing one of a changing and processing operation with respect to an output format of the multimedia information, and said control code having a content which is optically visible in a non-human-comprehensible form; and a legible name recorded on the sheet recording medium in a vicinity of the control code, said legible name corresponding to the content of the control code and enabling visual comprehension of the content of the control code;

wherein the control code and the multimedia information are readable by an optical reading device of an output apparatus, and wherein the output format of the multimedia information is either changed or processed when the optical reading device of the output apparatus reads the control code; and wherein the code pattern for one of the control code and the multimedia information includes a plurality of blocks each of which includes:

a dot pattern having a plurality of dots arranged in accordance with the content of said one of the control code and the multimedia information;

a marker having a pattern differing from the dot pattern, and having a first positional relationship with the dot pattern; and a block address pattern representing an address of each of the plurality of blocks, and having a second positional relationship with the marker.

2. The code sheet according to claim 1, wherein the code sheet comprises:

a plurality of control codes recorded on the sheet recording medium in a separated manner so as to be individually readable, said plurality of control codes each being associated with respective different control operations for controlling the output format of the multimedia information; and a plurality of legible names recorded in the vicinity of the control codes for visibly indicating the respective different control operations associated with each of the control codes.

3. An information reproducing apparatus comprising:

reading means for selectively optically reading each of multimedia information recorded on a code sheet as an optically readable code pattern and a control code also recorded on the code sheet as an optically readable code pattern, said multimedia information including at least one of audio information, image information and digital code data, and said control code representing control data used for executing one of a changing and processing operation with respect to an output format of the multimedia information;

reproduction means for processing each code pattern read by the reading means and for outputting one of multimedia information and output control data in accordance with each read one of the code patterns;

data determination means for determining whether the data output from the reproduction means is multimedia information or output control data; and processing means for one of changing and processing the multimedia information in accordance with the output control data when the data determination means determines that the data output from the reproduction means is the control data;

wherein the multimedia information and the control code each have a content which is optically visible in a non-human-comprehensible form, and a legible name is recorded on the code sheet in a vicinity of the control code, said legible name corresponding to the content of the control code and enabling visual comprehension of the content of the control code.

4. The information reproducing apparatus according to claim 3, wherein the code sheet comprises:

a plurality of control codes recorded on the sheet recording medium in a separated manner so as to be individually readable, said plurality of control codes each being associated with respective different control operations for controlling the output format of the multimedia information; and a plurality of legible names recorded in the vicinity of the control codes for visibly indicating the respective different control operations associated with each of the control codes.

5. The information reproducing apparatus according to claim 4, wherein the code sheet comprises a sheet recording medium on which the plurality of control codes and the plurality of names are recorded.

6. The information reproducing apparatus according to claim 3, further comprising:

an output apparatus for outputting the multimedia information; and wherein when the data determination means determines that the data output from the reproduction means is the control data, a control operation associated with the control data is performed by the output apparatus.

7. The information producing apparatus according to claim 3, wherein the code pattern includes a plurality of blocks each of which includes:

a dot pattern having a plurality of dots arranged in accordance with one of the contents of the control code and a content of the multimedia information;

a marker having a pattern differing from the dot pattern, and having a first positional relationship with the dot pattern; and a block address pattern representing an address of each of the plurality of blocks, and having a second positional relationship with the marker.

8. A code sheet comprising:

a sheet recording medium;

multimedia information recorded on the sheet recording medium as an optically readable code pattern, said multimedia information including at least one of audio information, image information and digital code data, and said multimedia information having a content which is optically visible in a non-human-comprehensible form;

a control code also recorded on the sheet recording medium as an optically readable code pattern, said control code representing control data used for executing one of a changing and processing operation with respect to an output format of the multimedia information, and said control code having a content which is optically visible in a non-human-comprehensible form; and a legible name recorded on the sheet recording medium in a vicinity of the control code, said legible name corresponding to the content of the control code and enabling visual comprehension of the content of the control code;

wherein the control code and the multimedia information are readable by an optical reading device of an output apparatus, and wherein the output format of the multimedia information is either changed or processed when the optical reading device of the output apparatus reads the control code;

wherein when there are different control operations for changing or processing the output format of the multimedia information, the code sheet comprises:

a multi-control code as an optically readable code pattern representing control data items associated with the respective different control operations, said multi-control code having contents which are optically visible in a non-human-comprehensible form; and a plurality of selecting codes which are recorded on the sheet recording medium in a spaced apart manner so as to be individually readable, said selecting codes being used for selecting respective ones of the plurality of control data items;

and wherein the code pattern includes a plurality of blocks each of which includes:
- a dot pattern having a plurality of dots arranged in accordance with one of the contents of the control code and a content of the multimedia information;
- a marker having a pattern differing from the dot pattern, and having a first positional relationship with the dot pattern; and
- a block address pattern representing an address of each of the plurality of blocks, and having a second positional relationship with the marker.

9. The code sheet according to claim 8, wherein each of the control data items contained in the multi-control code includes identification data which differentiates said each control data item from the other control data items, and which is associated with a corresponding one of said selecting codes.

* * * * *

UNITED STATES PATENT AND TRADEMARK OFFICE
CERTIFICATE OF CORRECTION

PATENT NO. : 6,072,917
DATED : June 6, 2000
INVENTOR(S) : Takeshi MORI et al.

It is certified that error appears in the above-indentified patent and that said Letters Patent is hereby corrected as shown below:

Title page,
Item [56] References Cited under "U.S. PATENT DOCUMENTS", change "4,276,573   6/1981"

to --5,276,573   1/1994--.

Signed and Sealed this

Twenty-second Day of May, 2001

Attest:

NICHOLAS P. GODICI

Attesting Officer        Acting Director of the United States Patent and Trademark Office